US010282398B1

(12) United States Patent
Moss et al.

(10) Patent No.: US 10,282,398 B1
(45) Date of Patent: May 7, 2019

(54) EDITING TOOL FOR DOMAIN-SPECIFIC OBJECTS WITH REFERENCE VARIABLES CORRESPONDING TO PRECEDING PAGES

(71) Applicant: INTUIT INC., Mountain View, CA (US)

(72) Inventors: John Brian Moss, Carlsbad, CA (US); Sypraseuth Vandy Siligato, San Diego, CA (US); Olivier Nguyen Thanh Khiet, San Diego, CA (US); Travis Dahl, Ramona, CA (US); Chase Patrick Murphy, Poway, CA (US); Brian Chung, San Diego, CA (US)

(73) Assignee: Intuit, Inc., Mountain View, CA (US)

( * ) Notice: Subject to any disclaimer, the term of this patent is extended or adjusted under 35 U.S.C. 154(b) by 0 days.

(21) Appl. No.: 15/394,441

(22) Filed: Dec. 29, 2016

(51) Int. Cl.
*G06F 17/21* (2006.01)
*G06F 17/22* (2006.01)
*G06F 17/24* (2006.01)
*G06F 3/0483* (2013.01)

(52) U.S. Cl.
CPC ........ *G06F 17/2247* (2013.01); *G06F 3/0483* (2013.01); *G06F 17/212* (2013.01); *G06F 17/2288* (2013.01); *G06F 17/24* (2013.01)

(58) Field of Classification Search
CPC .... G06F 17/24; G06F 17/2288; G06F 17/212; G06F 17/2247; G06F 3/0483
See application file for complete search history.

(56) References Cited

U.S. PATENT DOCUMENTS

2008/0147527 A1* 6/2008 McIntyre ............... G06Q 40/02
705/31

OTHER PUBLICATIONS

Greg Harvey, "Excel 2010 for Dummies", Wiley Publishing, 2010.*

* cited by examiner

Primary Examiner — Cesar B Paula
Assistant Examiner — Konrad J Kulikowski
(74) Attorney, Agent, or Firm — Patterson + Sheridan, LLP

(57) ABSTRACT

Embodiments presented herein provide an editing tool for domain-specific machine-readable objects. The editing tool identifies a domain-specific machine-readable object selected for editing. The object corresponds to a page included in a sequence of pages and is configured to adjust content for the page based on variables. One or more previous pages in the sequence are configured to solicit input to define the variables. The editing tool also identifies a scenario selected for previewing the page. The scenario includes values for the variables. Assets of the object reference the variables in expressions or other logic. The editing tool renders the object based on the scenario.

20 Claims, 10 Drawing Sheets

EDITING TOOL FOR DOMAIN-SPECIFIC OBJECTS WITH REFERENCE VARIABLES CORRESPONDING TO PRECEDING PAGES

BACKGROUND

Field

Embodiments presented herein generally relate to systems for modifying and previewing objects (e.g., JSON objects) for web applications. More specifically, an editing tool is disclosed that allows domain experts without knowledge of the underlying machine-readable syntax to modify and preview objects used to define a workflow for a web application.

Related Art

Data has to be stored in a machine-readable format to be parsed and processed by a software application. There are many machine-readable formats that can be used. For example, Javascript object notation (JSON) is a text-based format for data interchange. JSON is derived from the JavaScript programming language for representing objects. In general, JSON is easier to read than some other formats for data interchange, such as extensible markup language (XML). JSON can also be parsed relatively easily (e.g., by a standard Javascript function). JSON feeds can be asynchronously loaded much more easily than rich site summary (RSS) feeds. These advantages make JSON a useful format for Ajax-style web applications that frequently send and receive data via networks.

Ajax-style web applications are currently used in many industries. Laws that govern some of these industries change frequently. To keep pace with these changes, two separate groups of people often work together: programmers (who develop and maintain the web application code) and domain experts (who understand the industry and what the changes in the law mean). Domain experts explain what the changes in the law mean to the programmers. The programmers, in turn, determine how to reflect those changes in the web application code. For example, existing JSON object definitions may have to be modified or additional JSON object definitions may have to be written to keep the web applications up to date. The programmers make the changes accordingly. Once changes have been made, the programmers test the web applications to ensure the changes did not introduce bugs or cause unexpected application behavior. The domain experts also review the content displayed by the web applications for accuracy.

SUMMARY

One embodiment of the present disclosure includes a method for editing domain-specific machine-readable (e.g., JSON) objects. The method generally includes identifying a domain-specific machine-readable object selected for editing, wherein the object corresponds to a page included in a sequence of pages and is configured to adjust content for the page based on variables, and wherein one or more previous pages in the sequence are configured to solicit input to define the variables; identifying a scenario selected for previewing the page, wherein the scenario includes values for the variables, and wherein the variables are referenced by assets in the object; and rendering the object in a page-preview region of a graphical user interface (GUI) based on the values for the variables.

Another embodiment provides a computer-readable storage medium having instructions, which, when executed on a processor, performs an operation for editing domain-specific machine-readable (e.g., JSON) objects. The operation generally includes identifying a domain-specific machine-readable object selected for editing, wherein the object corresponds to a page included in a sequence of pages and is configured to adjust content for the page based on variables, and wherein one or more previous pages in the sequence are configured to solicit input to define the variables; identifying a scenario selected for previewing the page, wherein the scenario includes values for the variables, and wherein the variables are referenced by assets in the object; and rendering the object in a page-preview region of a graphical user interface (GUI) based on the values for the variables.

Still another embodiment of the present disclosure includes a processor and a memory storing a program, which, when executed on the processor, performs an operation for editing domain-specific machine-readable (e.g., JSON) objects. The operation generally includes identifying a domain-specific machine-readable object selected for editing, wherein the object corresponds to a page included in a sequence of pages and is configured to adjust content for the page based on variables, and wherein one or more previous pages in the sequence are configured to solicit input to define the variables; identifying a scenario selected for previewing the page, wherein the scenario includes values for the variables, and wherein the variables are referenced by assets in the object; and rendering the object in a page-preview region of a graphical user interface (GUI) based on the values for the variables.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 3A illustrates an GUI that allows non-technical users to create test scenarios and edit JSON objects, according to an embodiment.

FIG. 3B illustrates how the GUI appears when the JSON object is rendered for a different scenario, according to an embodiment.

FIG. 3C illustrates an example GUI that allows non-technical users to create test scenarios and edit JSON objects, according to an embodiment.

FIG. 3D illustrates an example GUI that allows non-technical users to create test scenarios and edit JSON objects, according to an embodiment.

FIG. 3E illustrates an example GUI that allows non-technical users to create test scenarios and edit JSON objects, according to an embodiment.

DETAILED DESCRIPTION

Figure 1:
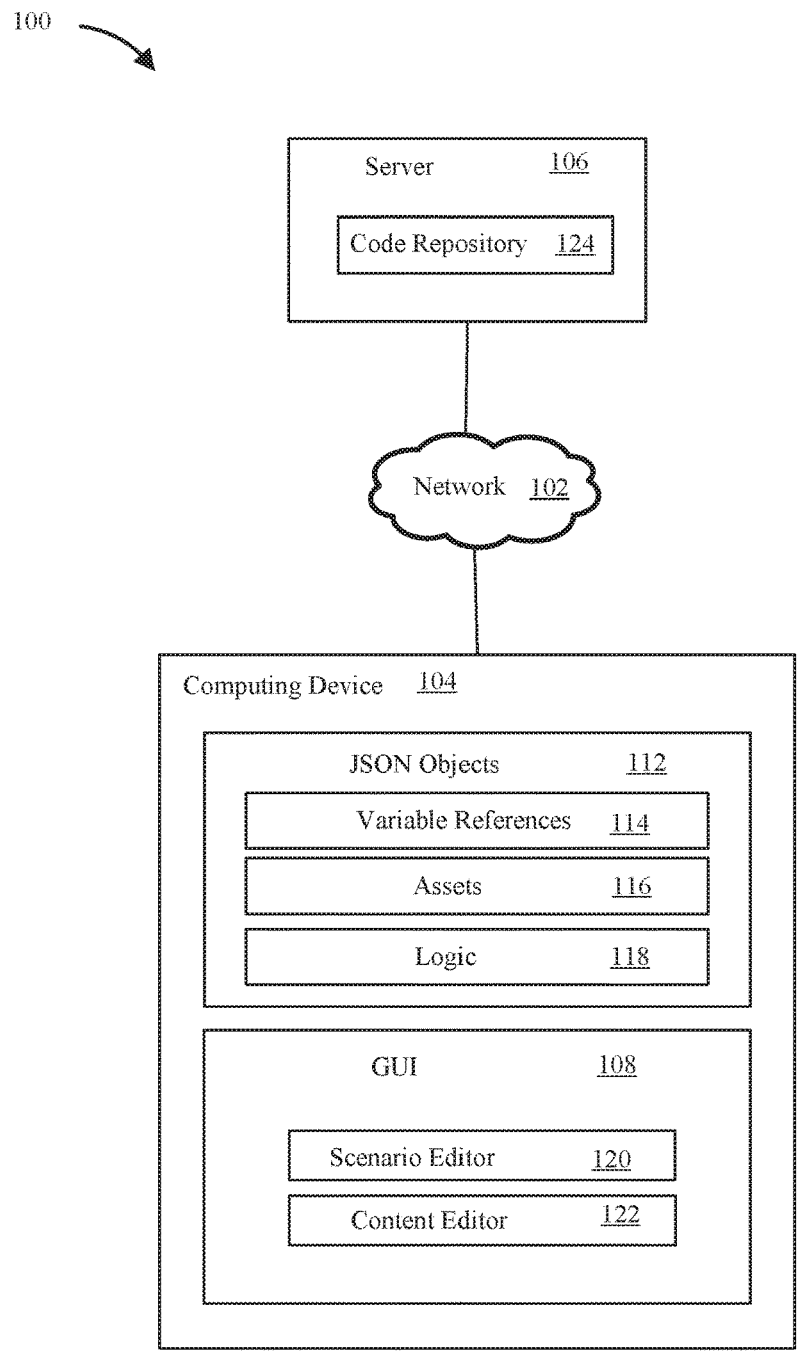
FIG. 1 illustrates a computing network environment wherein technology of the present disclosure can operate, according to one embodiment.

Embodiments presented herein provide an editing tool that allows non-technical users to modify workflow content stored in machine-readable objects (e.g., JSON objects) without being exposed to computer code. In one embodiment, a user selects a JSON object to edit in a graphical user interface (GUI) editor. The JSON object corresponds to a page included in a sequence of web pages used to perform a workflow associated with a distributed application (e.g., an online service used to prepare and file a tax return). Each page collects information from a user in order to generate content displayed to the user on each successive page based on input from previous pages. Specifically, logic encoded in the JSON object references variables that store the user input. The content shown on a page depends on the values of those variables when the logic is evaluated.

The GUI editor allows a user to change the values for the variables and preview how the changes are reflected in the page rendered for the JSON object. When using the GUI editor, the user can enter values for the variables directly into a sidebar without visiting previous pages in the sequence. This allows the user to test multiple sets of variable values quickly and efficiently (each set of values for the variables is considered a testing "scenario"). In addition, the GUI editor provides another sidebar that allows the user to edit content of the JSON object directly in an intuitive manner with editable fields so that the user does not have to understand JSON syntax and grammar (or other machine readable representation for the page or variables).

The GUI editor renders the page for the selected JSON object based on the variable values in a previewing area to show the user how the page appears for the scenario. When a user modifies the scenario or the content, the GUI editor updates the page to illustrate how the changes affect the content shown. The GUI editor can also render a box-model view of the JSON object to illustrate how member constructs are hierarchically arranged in the JSON object.

In one example, a distributed application which provides a tax-preparation service gathers user information using a series of pages. When a user access the application (e.g., via a web site), a first page asks for the user's name and street address (e.g., in a form). Once the user enters the name and street address, the second page of the web application is displayed. The second page asks for the user's date of birth. Once the user enters a date of birth, another page asking for additional information (e.g., marital status, number of dependents, etc.) is displayed. The web application continues the process until sufficient information has been gathered to prepare a tax return for the user. Each page shown to the user corresponds to a respective JSON object that is rendered in a browser to display the page. The information gathered from the user is stored in variables. For example, the tax year for which the user wishes to file a return can be stored in a variable (e.g., called "TaxYr") and the user's first name can be stored in another variable (e.g., called "PersonFirstNM"). Collectively, the values for the variables make up the user's individualized tax scenario.

The sequence of pages shown to a user may vary depending on the information the user provides. For example, a user who enters income recorded on a 1099-MISC form may be shown a page asking the user to enter business expenses. However, the application does not show this page for business expenses to a user who only enters income recorded on a W-2 form. By adjusting the sequence of pages shown to the user in this fashion, the application ensures that the content displayed on the pages and the information gathered is relevant for the user's tax return.

Since the application of this example helps users file tax returns, the application should be updated often to stay up to date due to the frequent changes in tax law. Updating the application, however, can be a complicated and relatively inefficient process for several reasons. First, the tax specialists (who are the domain experts in this example) typically lack the programming skills to update the JSON objects for the pages—particularly when the JSON objects include logic and variable references that create dependencies between the content displayed on a page and information gathered on previous pages in the sequence. Therefore, the tax experts typically have to rely on programmers to implement changes to the JSON objects. Conversely, the programmers are generally not tax experts. Changes to the JSON objects also have to be verified through testing before being released in an official update for the application.

The testing process is not straightforward, though, because the application has to be tested for many different tax scenarios (e.g., where each scenario is represented by a combination of possible variable values). Furthermore both page functionality and page content has to be checked—and the content displayed on a page may vary if the JSON object for the page depends on information gathered by previous pages in the sequence. Suppose, for example, a tax specialist wants to test how recent updates have affected the content displayed on a certain page for several different tax scenarios. For each tax scenario tested, the tax specialist will be obliged not only to visit the page she wishes to test, but also to visit each previous page in the sequence that is used to gather the variable values defining the scenario. This repeated backtracking through multiple pages to input variable values for each scenario may be tedious and inefficient. Furthermore, if the tax specialist wants to correct any of the content, the tax specialist has to communicate with the programmers, wait for the programmers to make the correction, and repeat the testing process. Thus, some aspects of the JSON objects that allow the application to dynamically adjust content also complicate the process of updating the application.

Embodiments of the present disclosure provide a software tool with a graphical user interface (GUI) that allows a non-technical user to edit JSON objects, preview how the JSON objects will appear when rendered for different test scenarios, and change test scenarios without having to traverse previous pages to enter the changes. Further, embodiments represented herein use JSON objects as a reference example of machine-readable objects. Embodiments recited herein use tax as an example of a domain and tax specialists as an example of domain experts.

FIG. 1 illustrates a computing environment 100, according to one embodiment. As shown, the environment 100 includes a network 102, a computing device 104, and a server 106. GUI 108 executes at a computing device 104 and includes content editor 122 and scenario editor 120. JSON objects 112 correspond to pages designed to be presented to a user in a sequence to collect information. The JSON objects 112 are configured to adjust content of the pages based on the information collected as the user navigates through the sequence.

At least some of the JSON objects 112 include variable references 114, assets 116, and logic 118. In this context, the term "asset" refers to a component of a JSON object, such as an object member, a primitive attribute, or some other type of modular component. The JSON objects 112 use the variable references 114 to help determine which content to display on the pages of the sequence. For example, an asset of a JSON object can include a reference to a variable containing the user's name to personalize a prompt (or another content item) on the page corresponding to the JSON object. For example, if a user's name is "John," a prompt may appear as "John, how many states did you live in last year?" For another user named "Mike," the prompt on the same page may appear as "Mike, how many states did you live in last year?"

The assets 116 of the JSON object can also include logic 118. The logic 118 may provide expressions or equations in computer-readable code (e.g., in Javascript). The logic 118 can include one or more of the variable references 114. When a page is rendered, the content editor 122 evaluates variable references 114 and the logic 118 of the JSON object corresponding to the page to determine which content to display.

In one embodiment, the content editor 122 allows non-technical users (e.g., tax specialists or other domain specialists) to modify the JSON objects 112 without requiring knowledge of JSON syntax. In addition, the content editor 122 also allows users to preview a modified page using any of the scenarios 120. Each scenario 120 may specify a combination of values for variables referenced by the JSON objects 112. Using the scenario editor 120, users can create, modify, and save scenarios. The scenario editor 120 shows editable fields for the variables referenced by the JSON objects 112 to allow users to change the values of the variables without actually visiting the pages designed to collect the values. Each of the scenarios 120 simulates an instance of a user interacting with the application without requiring a tester to enter the values on the prior pages in the sequence. In plainer terms, a tax specialist does not have to fill out 29 pages of workflow for a tax return to see how page 30 of the workflow that will appear. Instead, the scenario editor 120 identifies which information is referenced by page 30 and allows the user to specify the information in one place. In this regard, each of the scenarios 120 serves as a mock instance for testing purposes.

The graphical user interface (GUI) 108 also includes a page-preview region. Once a user selects a page and a scenario to preview or edit, the content editor 122 renders the JSON object corresponding to the page in the page-preview region. The content editor 122 uses the variable values of the scenario to determine which content to display on the page. In addition, the content editor 122 allows the user to select areas of content displayed on the page (e.g., using a cursor). Each selectable area rendered on the page corresponds to an asset in the JSON object 112. When an area of the page is selected, the content editor 122 displays one or more editable fields (or other editable elements) for the corresponding asset. When the user changes text in the editable fields, the content editor 122 updates the page shown in the page-preview area to reflect the changes.

Once a user is satisfied with any changes made to the JSON objects 112, the GUI 108 can send the changes to the code repository 124 at the server 106 via the network 102. The code repository 124 includes the finalized versions of the JSON objects 112 that will be used for a web site.

Figure 2:
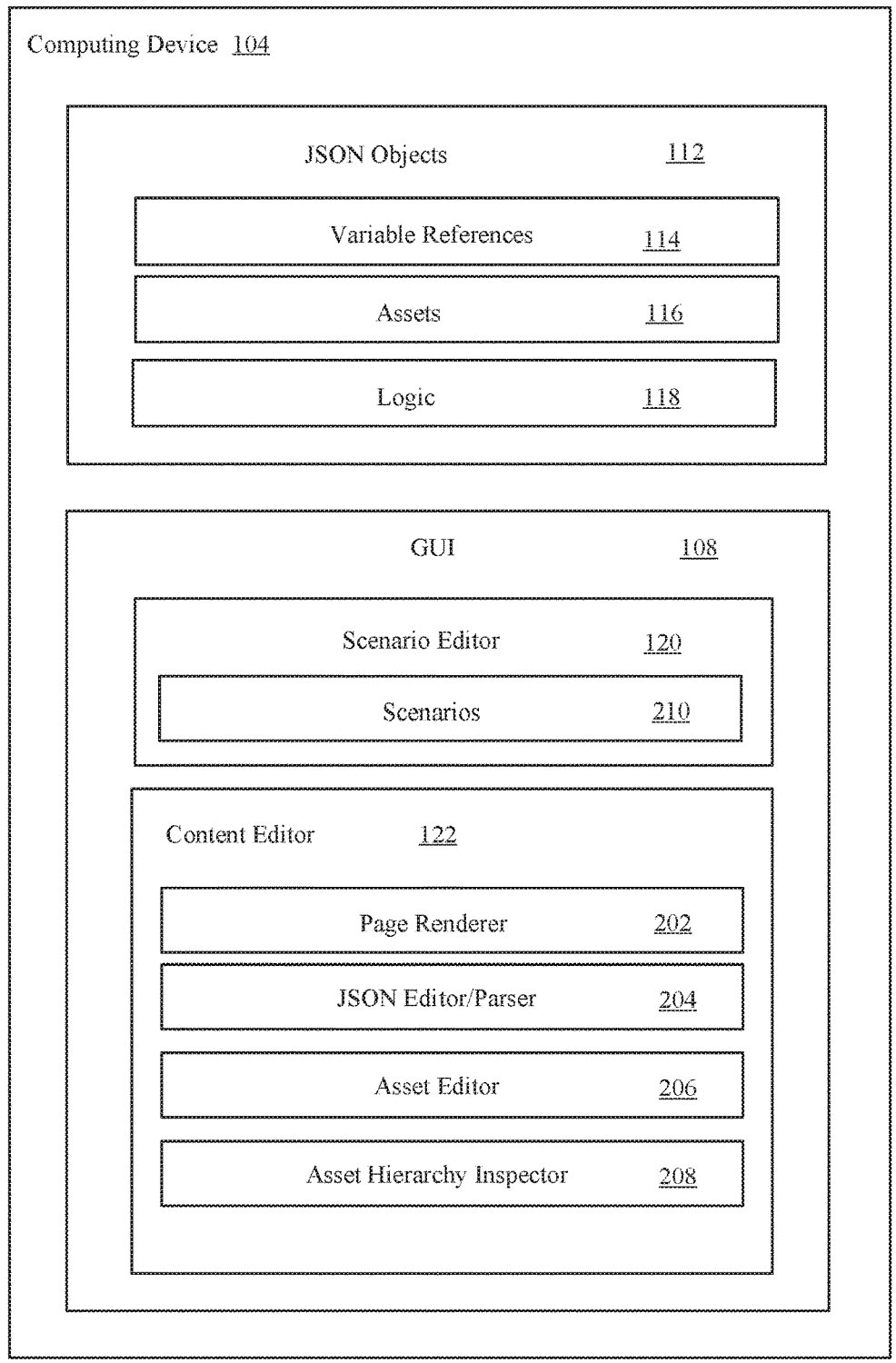
FIG. 2 illustrates a detailed view of a content editor, according to one embodiment.

FIG. 2 illustrates a detailed view of the content editor 122, according to one embodiment. A user selects one of the JSON objects 112 for editing. The user also selects one of the scenarios 210. The page renderer 202 renders the selected JSON object in a page-preview region of the GUI 108 based on the selected scenario. The page renderer 202 uses values the scenario provides for variables indicated by the variable references 114. Some of the variable references 114 are used in the logic 118. The page renderer 202 uses the values for the referenced variables to evaluate the logic 118. The page renderer 202 evaluates the logic 118 to determine how to adjust content for the assets 116 of the selected JSON object. For example, the page renderer 202 may determine which of at least two alternative versions of the content to render for one of the assets 116 based on the values and the logic 118.

In addition, the content editor 122 allows the user to select areas of content displayed on the page-preview region (e.g., using a cursor). Each selectable area rendered in the page-preview region corresponds to one of the assets 116 in the selected JSON object. When an area of the page is selected, the asset editor 206 displays one or more editable fields (or other editable elements) for the corresponding asset. When the user changes text in the editable fields, the page renderer 202 updates the rendering shown in the page-preview area to reflect the changes.

The scenario editor 120 shows editable fields for the variables referenced by the JSON objects 112. When the user updates values for the variables in the editable fields, the page renderer 202 updates the rendering shown in the page-preview area to reflect the changes.

In one embodiment, the JSON editor/parser 204 presents the source code of the JSON object in the page-preview area instead of a rendered view. While non-technical users may be less interested in seeing the source code, this option may appeal to programmers who use the GUI 108 to edit the JSON objects 112. In addition, the asset hierarchy inspector 208 allows a user to see a box-model view of the JSON object. The box-model view illustrates the JSON object as a series of nested boxes. Each box represents an object (e.g., an asset). When a first box is contained within second box, the asset represented by the first box is a member object contained in the asset represented by the second box. The box-model viewing option allows user to visualize how assets 116 are hierarchically arranged in each of JSON objects 112.

Figure 3A:
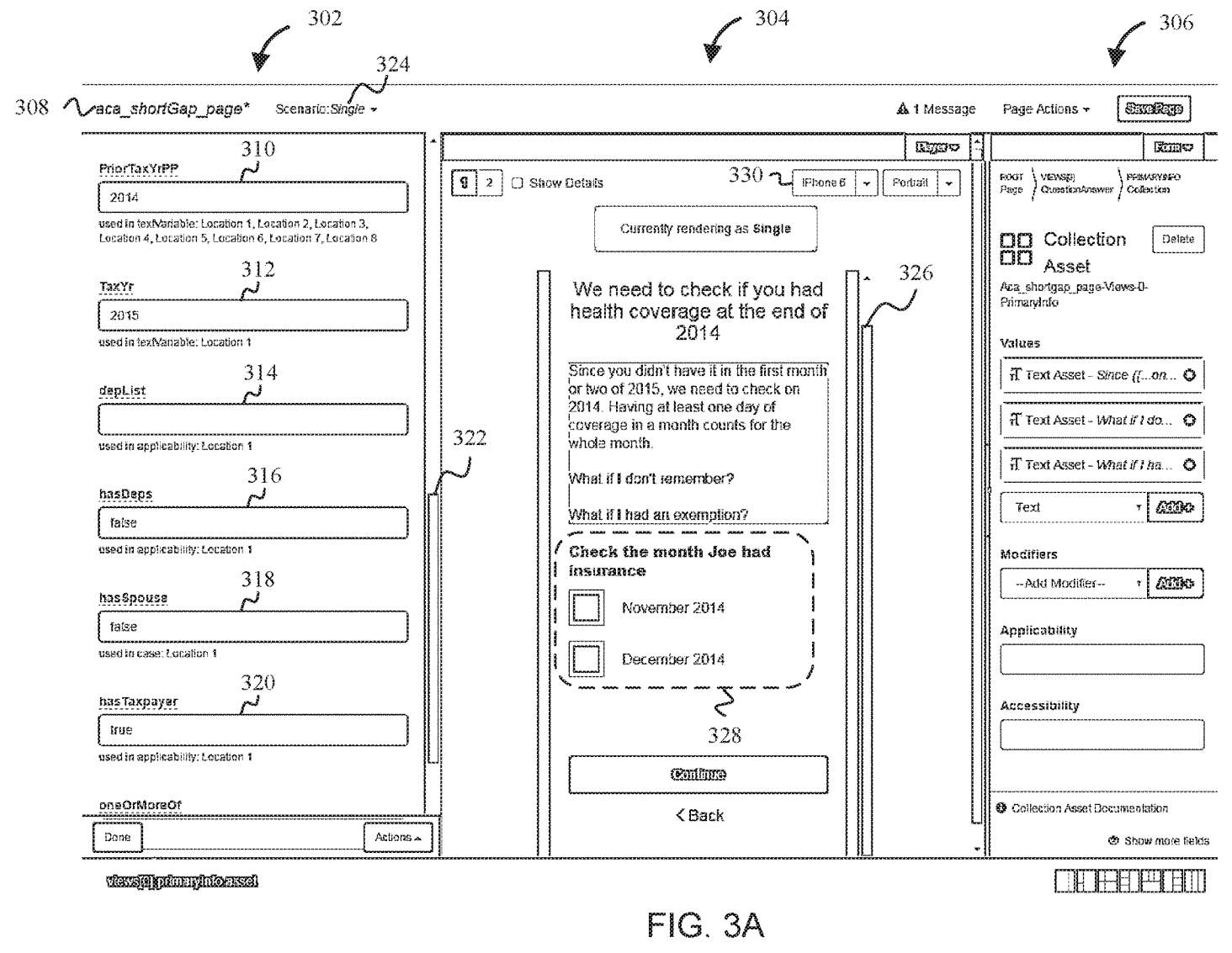

FIG. 3A illustrates an example GUI of an editing tool that allows non-technical users to create test scenarios and edit JSON objects, according to one embodiment. As shown, the example GUI includes a scenario editor region 302, a previewing region 304, and an asset editor region 306. The title 308 ("aca_shortgap_page*") indicates the JSON object and corresponding page that are currently selected for editing. In this example, this is a page that gathers information pertaining the Affordable Care Act (ACA) from users who did not have health insurance for the first month or two of the current tax year (i.e., users that had a "short gap" in coverage, as indicated by user answers to prompts that would be presented on previous pages). The page is shown in the previewing area as it would appear on a device type indicated in box 330. The scroll bar 326 allows a user to scroll up or down to view any additional content that would be displayed on the page for the selected scenario.

The scenario name 324 ("Single") indicates the scenario for which the page is currently rendered in previewing area 304. The scenario editor region 302 includes editable fields for variables 310-320 that help determine which content is shown on the page. Specifically, field 310 indicates the prior tax year (2014, stored in a variable named "PriorTaxYrPP"), field 312 indicates the current tax year (2015, stored in a variable named "TaxYr"), field 314 indicates a list of the user's dependents (empty because the "single" scenario is meant to test for cases where users have no dependents), field 316 indicates whether the user has any dependents, field 318 indicates whether the user has a spouse, and field 320 indicates whether the user is a tax payer. Scroll bar 322 allows a user to scroll up or down to view additional editable fields for any additional variables. As shown, there is a label above each of the fields 310-320 indicating the name of the variable associated with the respective field. In addition, there is a caption beneath each of the fields 310-320 indicating which elements of the page shown in previewing area 304 reference the variable associated with the respective field. The scenario editor region 302 provides a way for a user to edit or create scenarios based on the variables that are actually references by the page without having to visit prior pages (i.e., without having to complete previous stages in a workflow to create a tax return).

As shown in selection 328 the page rendered from the JSON object using the variable values for the "Single" scenario displays checkboxes for the user to indicate whether "Joe" had health insurance in the last two months of 2014.

Figure 3B:
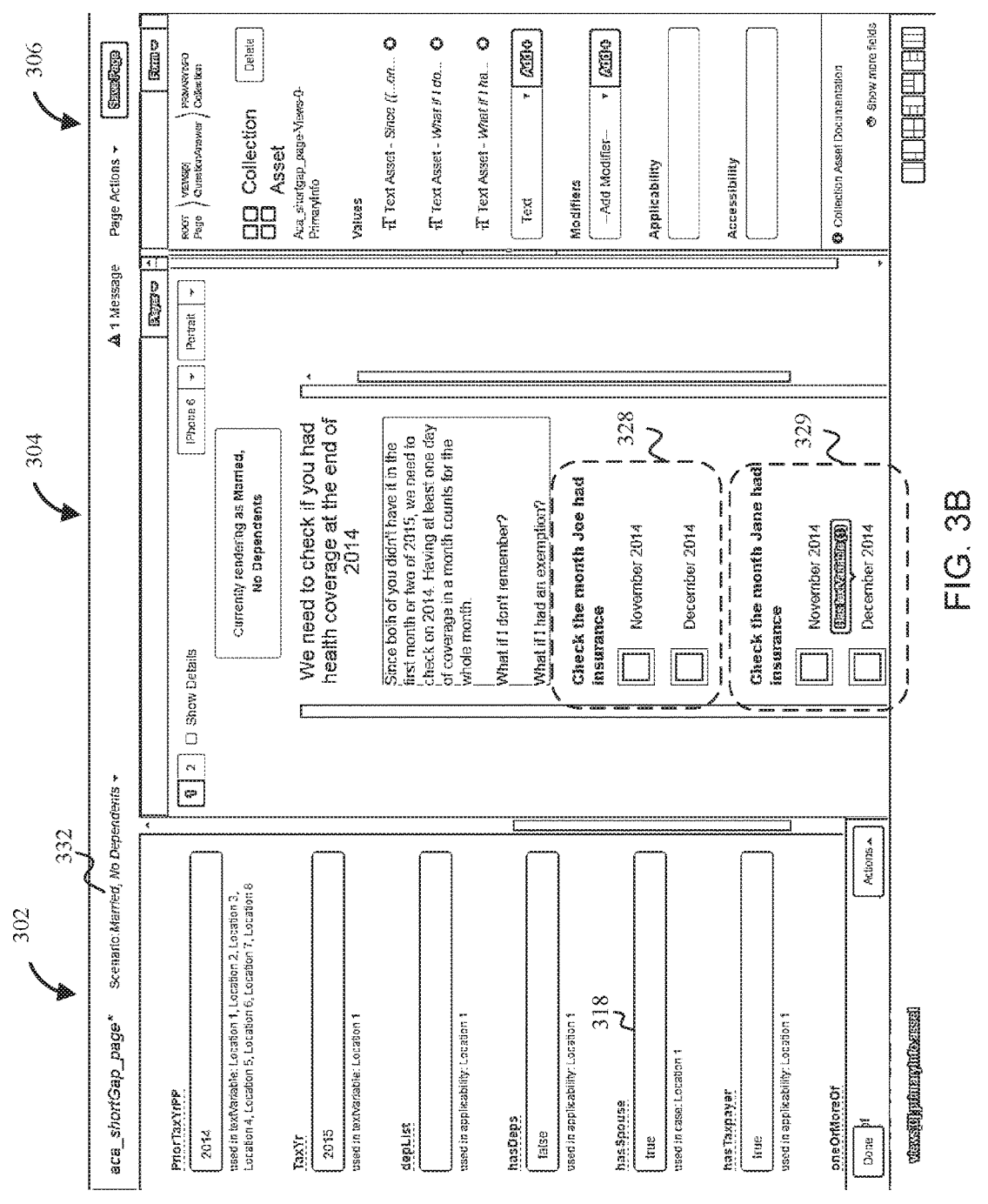

FIG. 3B illustrates the GUI of FIG. 3A rendered using data from a second scenario, according to one embodiment. Scenario name 332 ("Married, No Dependents") indicates the scenario for which the page is rendered in previewing area 304 in FIG. 3B. As shown, the value in the field 318 for the variable "hasSpouse" is "true" (instead of "false" as shown for the "Single" scenario). Since "hasSpouse" is listed as "true," selection 329 is displayed on the page in the previewing region 304. As shown, selection 329 displays checkboxes for the user to indicate whether "Jane" (the hypothetical name for the user's spouse, in this scenario) had health insurance in the last two months of 2014.

Figure 3C:
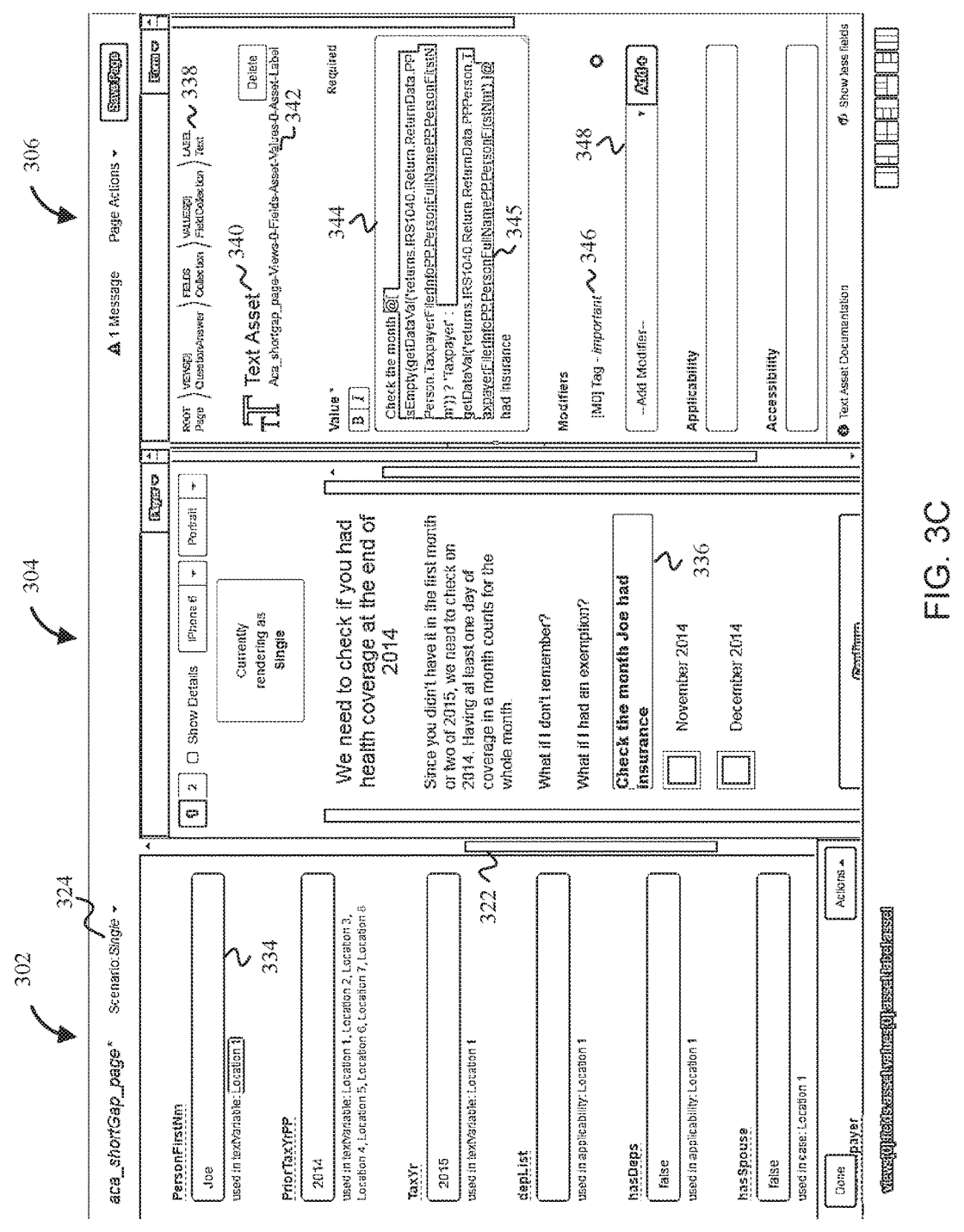

FIG. 3C illustrates a GUI of the editing tool, according to an embodiment. As shown, the scenario name 324 ("Single") indicates the name of a scenario rendered in previewing area 304. The position of the scroll bar 322 has been changed so that the editable field 334 for the variable "PersonFirstNm" (person's first name) is visible in the scenario editor region 302. As shown, the field 334 contains the name of a user used for the scenario, "Joe."

When the GUI detects that text element 336 is selected on the page rendered in the previewing area 304 (e.g., by detecting a click or another input event on text element 336), the GUI displays information about the asset that corresponds to text element 336 in the asset editor region 306. Specifically, asset name 342 indicates the name of the asset and asset type 340 indicates that the asset is a "text asset." Nesting information 338 indicates where the asset is located in a hierarchy of objects that make up the JSON object. Modifier list 346 indicates any modifiers associated with the asset and field 348 allows the user to add additional modifiers. Editable field 344 contains text rendered in text element 336.

Field 344 also contains logic 345. In this example, the logic 345 is a shorthand if-else statement in Javascript. In plain terms, if the variable "PersonFirstNm" is empty, the logic 345 will return the word "Taxpayer" when evaluated. Otherwise, the logic 345 will return the value for variable "PersonFirstNum" (shown in field 334). Since the value "Joe" is in field 334, "PersonFirstNm" is not empty. Therefore, in FIG. 3C, the logic 345 returns the value of "PersonFirstName" when evaluated. For this reason, when text element 336 is rendered in FIG. 3C, the words "Check the month Joe had insurance" are displayed.

Figure 3D:
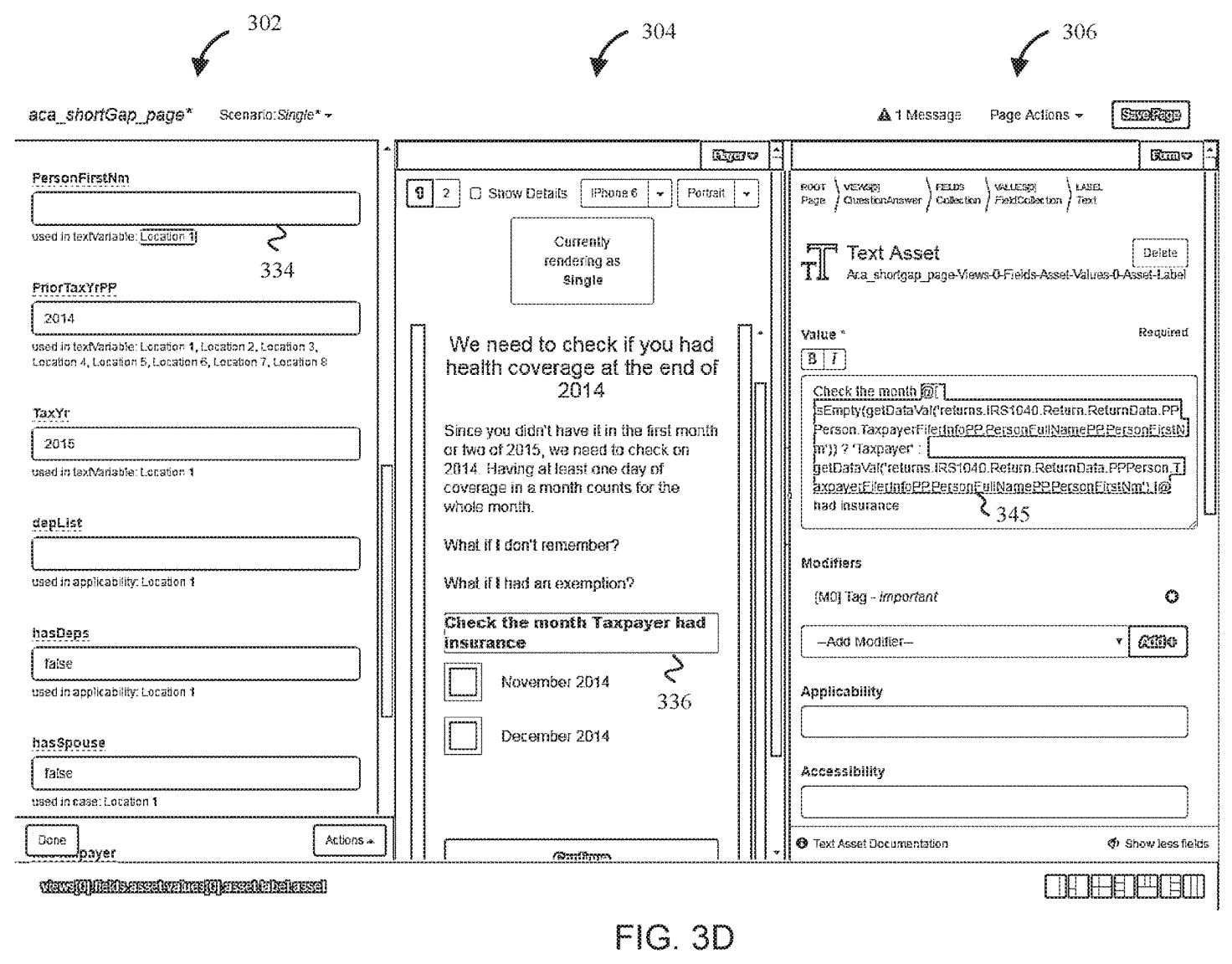

FIG. 3D illustrates another example GUI of the editing tool, according to an embodiment. Specifically, FIG. 3D illustrates a text element 336 rendered when the value for the variable "PersonFirstNm", stored in field 334, is blank. Since field 334 is blank, the logic 345 determines that "PersonFirstNm" is empty. Therefore, the logic 345 returns the word "Taxpayer" when evaluated. For this reason, when text element 336 is rendered in FIG. 3D, the words "Check the month Taxpayer had insurance" are displayed. Thus, the logic 345 allows the text element 336 to show different content depending on the scenario for which the JSON object is rendered.

Figure 3E:
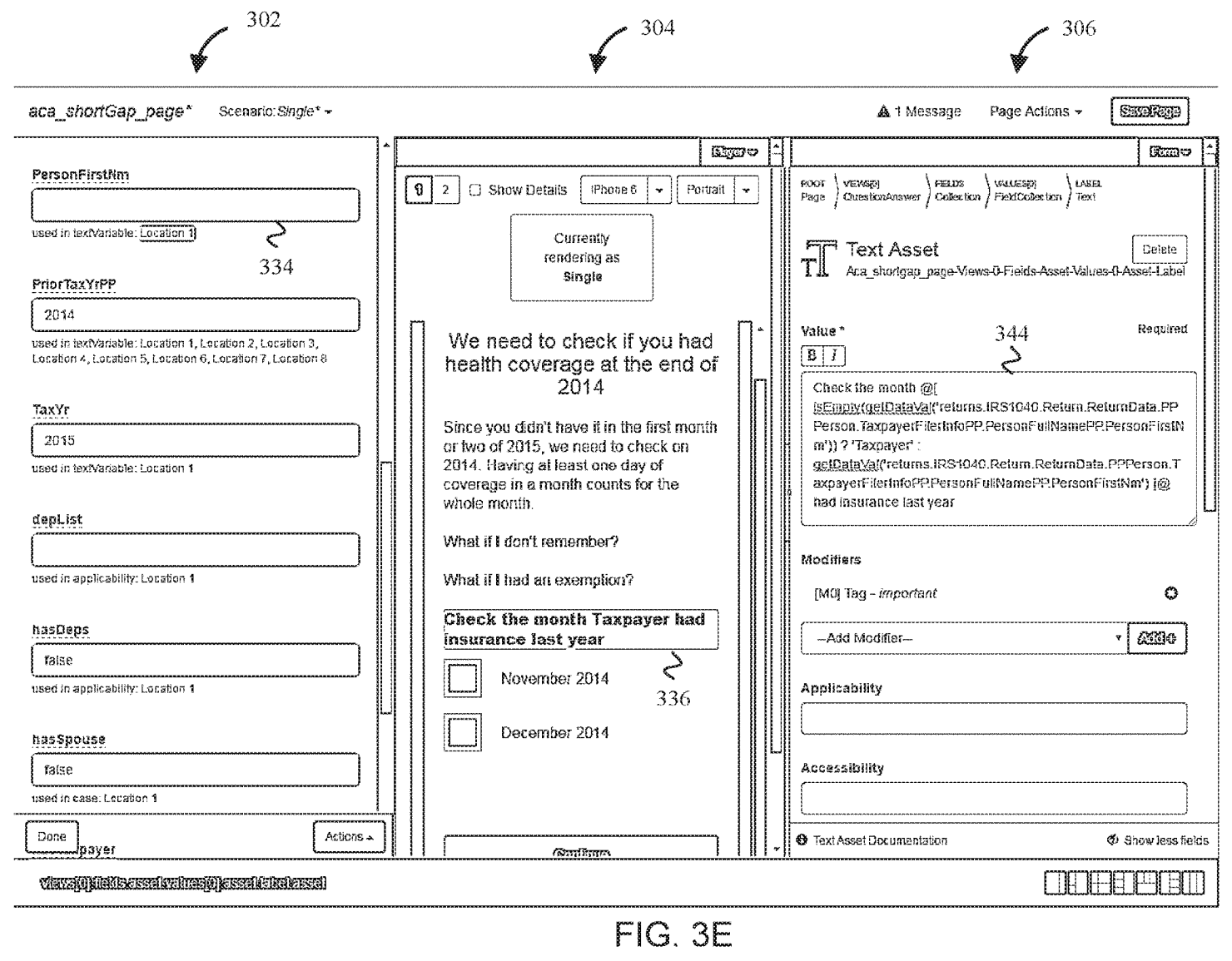

FIG. 3E illustrates another example GUI of the editing tool, according to an embodiment. Specifically, FIG. 3E illustrates text element 336 rendered after a user edits the text found in field 344. As shown, the words "last year" have been added to the end of the text in field 344. For this reason, when text element 336 is rendered in FIG. 3E, the words "Check the month Taxpayer had insurance last year" are displayed.

Figure 4:
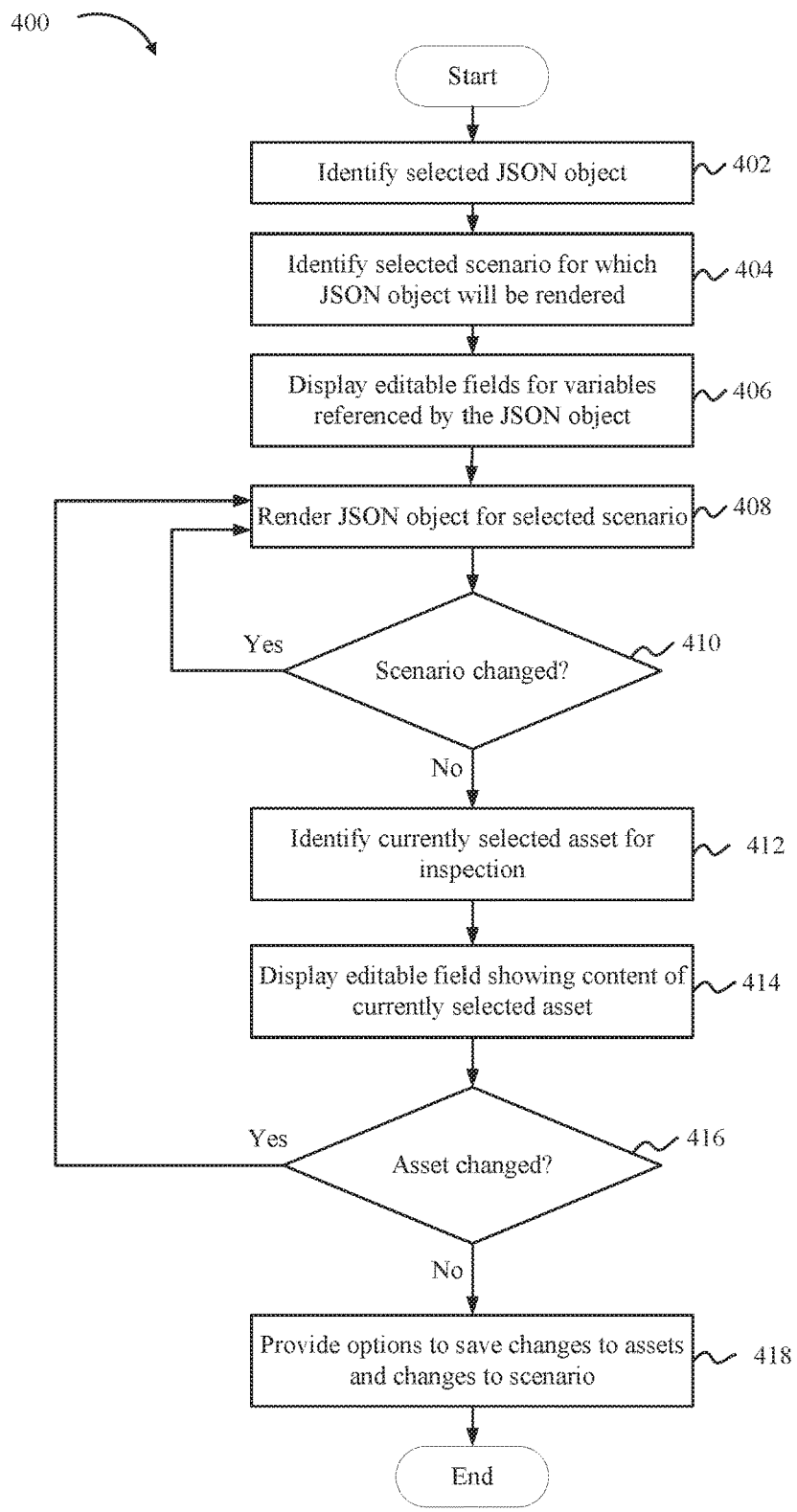
FIG. 4 illustrates a method for editing a JSON object in a GUI, according to one embodiment.

FIG. 4 illustrates a method 400 for editing a JSON object in a GUI, according to one embodiment. At step 402, a content editor identifies a JSON object selected for editing. The JSON object corresponds to a page included in a sequence of pages and is configured to adjust content for the page based on variables referenced by the JSON object. One or more previous pages in the sequence are configured to solicit values for the variables. In one embodiment, the content editor is a GUI.

At step 404, the content editor identifies a scenario selected for rendering by a user. The scenario includes values for the variables. At step 406, the content editor displays editable fields for the variables referenced by one or more assets of the JSON object. An editable field for a given variable contains the current value of that variable for the scenario. The editable fields can be displayed in a scenario editor region of the content editor. Allowing the user to edit variable values referenced by the JSON object, the scenario editor obviates the need for the user to visit any of the previous pages in the sequence (e.g., prior information—gathering steps in the workflow) to enter the values.

At step 408, the content editor renders the JSON object in a page-preview region of the content editor based on the scenario (e.g., based on the values the scenario gives for the variables). At step 410, the content editor determines whether the scenario has been modified since the JSON object was rendered. For example, a user can modify the scenario by changing the value of a variable in one of the editable fields. If the scenario has changed, the content editor repeats step 408. Otherwise, the content editor proceeds to step 412.

At step 412, the content editor identifies a currently selected asset for inspection. For example, the content editor can determine that a graphical element in the page-preview region corresponding to the asset has been selected (e.g., based on a click or another input event). At step 414, the content editor displays at least one editable field showing the content of the asset in an asset editor region.

At step 416, the content editor determines whether the asset has been modified since the JSON object was rendered. For example, a user can modify the asset by changing the content of the editable field in the asset editor region. If the asset has been modified, the content editor renders the JSON object again to reflect the changes. Otherwise, the content editor proceeds to step 418. At step 418, the content editor provides a user with options to save changes made to the scenario and changes made to assets, respectively.

Figure 5:
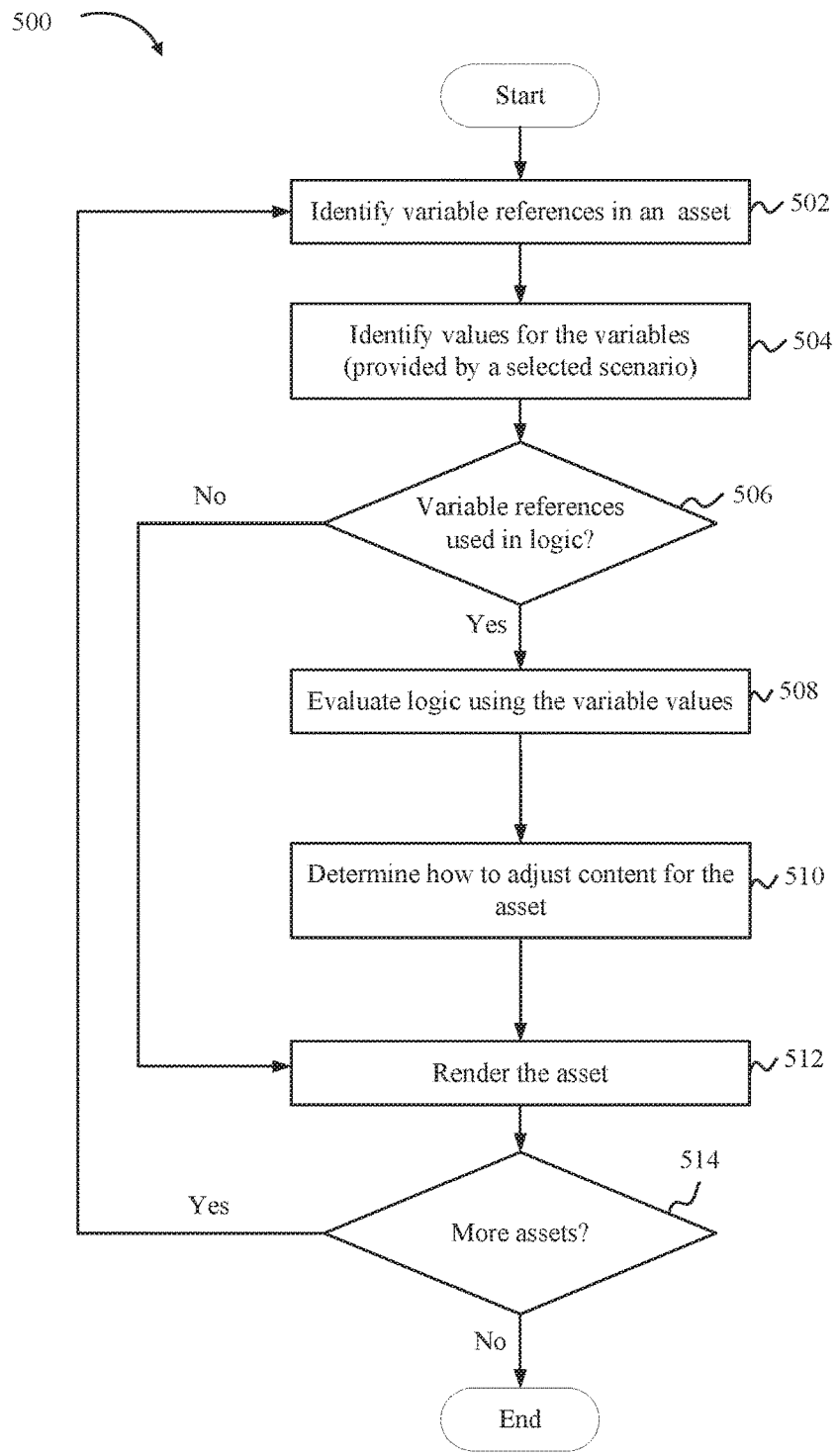
FIG. 5 illustrates a method for rendering a JSON object in a content editor, according to one embodiment.

FIG. 5 illustrates a method 500 for rendering a JSON object as a page in a content editor using a scenario, according to one embodiment. In one example, method 500 is an expanded view of step 408 of FIG. 4.

At step 502, the content editor identifies variable references in an asset of the JSON object. At step 504, the content editor identifies values for the variables. The values are provided in a scenario that is currently selected in the content editor.

At step 506, the content editor determines whether the variable references are used in any logic (e.g., expressions, equations, if-then constructs, etc.) found in the asset. If not, the content editor proceeds to step 512. If so, the content editor evaluates the logic using the values for the variables at step 508. At step 510, the content editor determines how to adjust content for the asset. For example, the content editor may determining which of at least two alternative versions of the content to render for the first asset based on the evaluation (e.g., based on the values and the logic).

At step 512, the content editor renders the asset in a page preview area on a display. At step 514, the content editor determines whether there are any more assets in the JSON object to be rendered. If so, the content editor repeats steps 502-512 for the next asset in the JSON object. Otherwise, the method 500 terminates.

Figure 6:
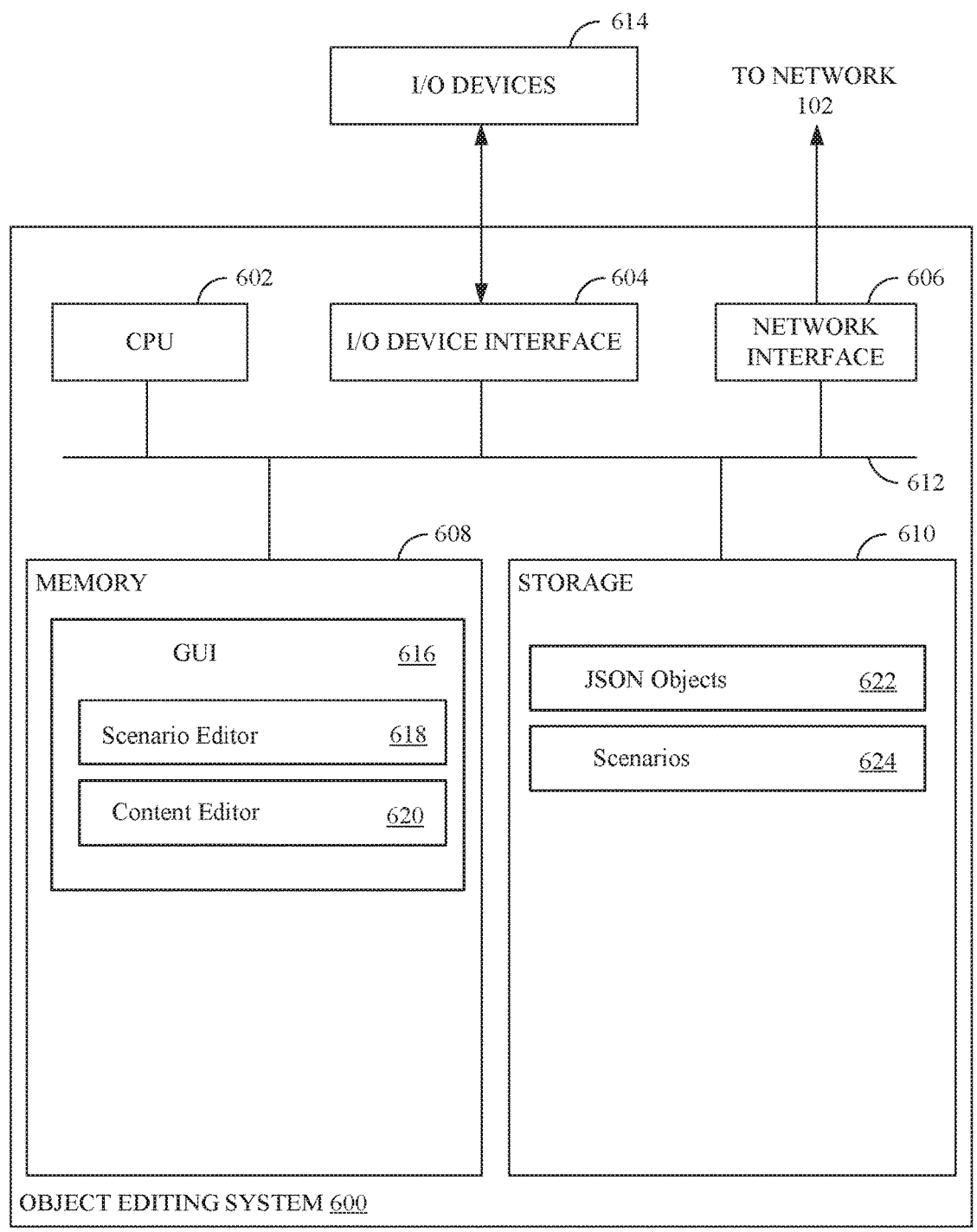
FIG. 6 illustrates an object editing system that allows non-technical users to edit JSON objects, according to an embodiment.

FIG. 6 illustrates an object editing system 600 that allows non-technical users to edit JSON objects, according to an embodiment. As shown, the object editing system 600 includes, without limitation, a central processing unit (CPU) 602, at least one I/O device interface 604 which may allow for the connection of various I/O devices 614 (e.g., keyboards, displays, mouse devices, pen input, etc.) to the object editing system 600, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, memory 608, and storage 610. CPU 602 can represent a single CPU, multiple CPUs, a single CPU having multiple processing cores, and the like. Additionally, the memory 608 represents random access memory. Furthermore, the storage 610 may be a disk drive. Although shown as a single unit, the storage 610 may be a combination of fixed or removable storage devices, such as fixed disc drives, removable memory cards or optical storage, network attached storage (NAS), or a storage area-network (SAN).

As shown, storage 610 includes JSON objects 622 and scenarios 624. As shown, memory 608 includes GUI 616, scenario editor 618, and content editor 620. JSON objects 622 correspond to pages included in a sequence of pages designed to gather information from a user and are configured to adjust page content for display based on variables. Specifically, the JSON objects 622 include logic that references the variables. Each of the scenarios 624 includes values for the variables. The content editor 620 render renders one of the JSON objects 622 using the values provided by one of the scenarios 624 to evaluate the logic.

In addition, the content editor 620 allows the user to toggle between a view representing how the page would appear on different devices, a view illustrating how member objects (e.g., assets) of the JSON object are arranged hierarchically, and a view showing the source code of the JSON object in the preview area. The content editor 620 also displays an asset editor region allowing the user to edit content of the JSON object (e.g., assets) using editable fields. The scenario editor 620 allows the user to edit the variable values of the scenario directly in editable fields without requiring the user to traverse previous pages of the sequence.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for editing machine-readable objects, the method comprising:
   displaying a graphical user interface comprising:
      a preview region displaying a current page based on a JSON object, wherein:
         the current page is one of a sequence of pages for performing a workflow associated with a web application; and
         the JSON object comprises a plurality of content assets for display on the current page; and
      a scenario editor region comprising a plurality of reference variable fields and an associated plurality of reference variable values, wherein:
         one or more of the current assets displayed in current page in the preview region is based on a reference variable value displayed in the scenario editor region; and
         one or more of the plurality of reference variable fields corresponds to a content asset displayed in a preceding page in the workflow and not in the current page in the workflow; and
      a content asset editor region comprising a plurality of content asset value fields, each of the content asset value fields being defined in the JSON object and editable in the content asset editor region;
      a scenario selection interface element, wherein a first scenario selected by the scenario selection interface element defines one or more of the plurality of reference variable values displayed in the scenario editor region;
      a device type interface element configured to select a device type display to emulate within the preview region;
   receiving, via the scenario selection interface element, a selection of a second scenario, wherein,
      the second scenario defines one or more of the plurality of reference variable values differently than the first scenario; and
      at least one of the plurality of reference variables defined by the second scenario corresponds to a content asset displayed in a preceding page in the workflow; and
   changing the current page in the preview region based on the second scenario.

2. The method of claim 1, wherein displaying the current page is also based on logic in a first content asset in the JSON object referencing at least one reference variable of the plurality of reference variables, and wherein evaluating the logic determines at least one content asset of the plurality of content assets to display in the current page.

3. The method of claim 2, wherein evaluating the logic comprises: determining which of at least two alternative versions of the at least one content asset to display in the current page.

4. The method of claim 1, further comprising:
   determining, based on an input event, that a graphical element corresponding to a first content asset of the plurality of content asset in the JSON object has been selected; and
   displaying a first editable field for the first content asset in the content asset editor region.

5. The method of claim 4, further comprising:
   receiving, via the first editable field, updated content for the first content asset; and
   changing the current page based on the updated content.

6. The method of claim 4, further comprising: displaying a second editable field in the scenario editor region for a variable referenced by the first content asset.

7. The method of claim 6, further comprising:
   receiving, via the second editable field, an updated value for the variable referenced by the first content asset; and
   changing the current page based on the updated value.

8. A non-transitory computer-readable storage medium containing instructions that, when executed by one or more processors, perform an operation for editing machine-readable objects, the operation comprising:
   displaying a graphical user interface comprising:
      a preview region displaying a current page based on a JSON object wherein:
         the current page is one of a sequence of pages for performing a workflow associated with a web application; and
         the JSON object comprises a plurality of content assets for display on the current page; and
      a scenario editor region comprising a plurality of reference variable fields and an associated plurality of reference variable values, wherein:
         one or more of the content assets displayed in current page in the preview region is based on a reference variable value displayed in the scenario editor region; and
         one or more of the plurality of reference variable fields corresponds to a content asset displayed in a preceding page in the workflow and not in the current page in the workflow; and
      a content asset editor region comprising a plurality of content asset value fields, each of the content asset value fields being defined in the JSON object and editable in the current asset editor region;
      a scenario selection interface element, wherein a first scenario selected by the scenario selection interface element defines one or more of the plurality of reference variable values displayed in the scenario editor region;
      a device type interface element configured to select a device type display to emulate within the preview region;
   receiving, via the scenario selection interface element, a selection of a second scenario, wherein:
      the second scenario defines one or more of the plurality of reference variable values differently than the first scenario; and
      at least one of the plurality of reference variables defined by the second scenario corresponds to a content asset displayed in a preceding page in the workflow; and
   changing the current page in the preview region based on the second scenario.

9. The non-transitory computer-readable storage medium of claim 8, wherein displaying the current page is also based on logic in a first content asset in the JSON object referencing at least one reference variable of the plurality of reference variables, and wherein evaluating the logic determines at least one content asset of the plurality of content assets to display in the current page.

10. The non-transitory computer-readable storage medium of claim 9, wherein evaluating the logic comprises:

determining which of at least two alternative versions of the at least one content asset to display in the current page.

11. The non-transitory computer-readable storage medium of claim 9, wherein the operation further comprises:
  determining, based on an input event, that a graphical element corresponding to a first content asset of the plurality of content assets in the JSON object has been selected; and
  displaying a first editable field for the first content asset in the content asset editor region.

12. The non-transitory computer-readable storage medium of claim 11, wherein the operation further comprises:
  receiving, via the first editable field, updated content for the first content asset; and
  changing the current page based on the updated content.

13. The non-transitory computer-readable storage medium of claim 11, wherein the operation further comprises: displaying a second editable field in the scenario editor region for a variable referenced by the first content asset.

14. The non-transitory computer-readable storage medium of claim 13, wherein the operation further comprises:
  receiving, via the second editable field, an updated value for the variable referenced by the first content asset; and
  changing the current page based on the updated value.

15. A system comprising:
  one or more processors; and
  memory storing one or more applications that, when executed on the one or more processors, perform an operation for editing machine-readable objects, the operation comprising:
    displaying a graphical user interface comprising:
      a preview region displaying a current page based on a JSON object, wherein:
        the current page is one of a sequence of pages for performing a workflow associated with a web application; and
        the JSON object comprises a plurality of content assets for display on the current page; and
      a scenario editor region comprising a plurality of reference variable fields and an associated plurality of reference variable values, wherein:
        one or more of the content assets displayed in current page in the preview region is based on reference variable value displayed in the scenario editor region; and
        one or more of the plurality of reference variable fields corresponds to a content asset displayed in a preceding page in the workflow and not in the current page in the workflow; and
      a content asset editor region comprising a plurality of content asset value fields, each of the content asset value fields being defined in the JSON object and editable in the content asset editor region;
      a scenario selection interface element, wherein a first scenario selected by the scenario selection interface element defines one or more of the plurality of reference variable values displayed in the scenario editor region;
      a device type interface element configured to select a device type display to emulate within the preview region;
    receiving, via the scenario selection interface element, a selection of a second scenario, wherein:
      the second scenario defines one or more of the plurality of reference variable values differently than the first scenario; and
      at least one of the plurality of reference variables defined by the second scenario corresponds to a content asset displayed in a preceding page in the workflow, and
    changing the current page in the preview region based on the second scenario.

16. The system of claim 15, wherein displaying the current page is also based on logic in a first content asset in the JSON object referencing at least one reference variable of the plurality of reference variables, and wherein evaluating the logic determines at least one content asset of the plurality of content assets to display in the current page.

17. The system of claim 16, wherein evaluating the logic comprises: determining which of at least two alternative versions of the at least one content asset to display in the current page.

18. The system of claim 16, wherein the operation further comprises:
  determining, based on an input event, that a graphical element corresponding to a first content asset of the plurality of content assets in the JSON object has been selected; and
  displaying a first editable field for the first content asset in the content asset editor region.

19. The system of claim 18, wherein the operation further comprises:
  receiving, via the first editable field, updated content for the first content asset; and
  changing the current page based on the updated content.

20. The system of claim 18, wherein the operation further comprises:
  displaying a second editable field in the scenario editor region for a variable referenced by the first content asset;
  receiving, via the second editable field, an updated value for the variable referenced by the first content asset; and
  changing the current page based on the updated value.

* * * * *